UNITED STATES PATENT OFFICE.

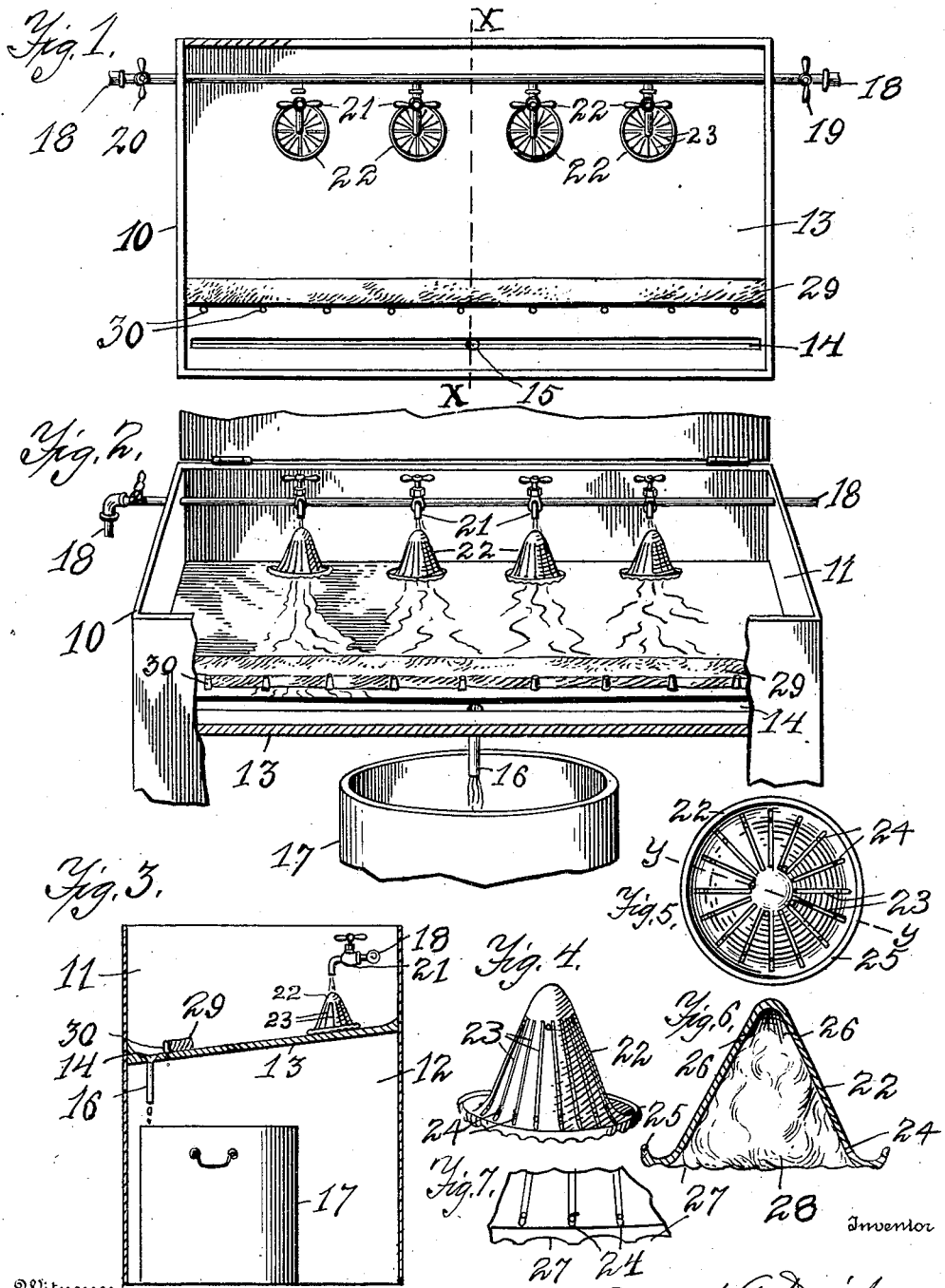

AUGUST A. DANIELSON, OF JAMESTOWN, NEW YORK, ASSIGNOR OF ONE-THIRD TO CONRAD T. JOHNSON AND ONE-THIRD TO HENRY A. LARSON, BOTH OF JAMESTOWN, NEW YORK.

WATER-FILTER.

968,744.  Specification of Letters Patent.  Patented Aug. 30, 1910.

Application filed January 20, 1910. Serial No. 539,109.

*To all whom it may concern:*

Be it known that I, AUGUST A. DANIELSON, a citizen of the United States, residing at Jamestown, in the county of Chautauqua and State of New York, have invented new and useful Improvements in Water-Filters, of which the following, taken in connection with the accompanying drawings, is a full, clear, and exact description.

The invention relates to water filters or filtering means whereby the water is cleansed from its impurities; and the object of the improvement is to provide a simple and convenient filter wherein the filtering means is easy of access and may be readily and quickly renewed and cleansed, and the invention consists in the construction and arrangement of the parts, as shown in this specification and the accompanying drawings, and pointed out in the claims.

In the drawings, Figure 1 is a plan view of the filter showing the arrangement of the parts. Fig. 2 is a perspective view of the filter, with the lid raised and the front broken away to show the construction and arrangement. Fig. 3 is a sectional view at line X X in Fig. 1. Fig. 4 is a side elevation, Fig. 5 a plan view, and Fig. 6 a sectional view at line Y Y of Fig. 5, of one of the filtering cones, showing the construction and arrangement of the same; and Fig. 7 is a detail elevation of a portion of the edge of the cone.

Similar numerals refer to corresponding parts in the several views.

The numeral 10 indicates the case or covering of the receptacle for the filter which consists preferably of a cupboard or chest having a suitable lid and openings thereto and is divided into upper and lower compartments, indicated by the numerals 11 and 12, by means of the inclined partition 13.

A groove 14 is provided at the lower edge of the partition 13, which groove gradually deepens toward the hole 15, which hole leads by a pipe 16 to a receptacle 17 in the lower compartment 12.

The water is introduced to the compartment 11 by means of a pipe 18 which is preferably controlled at each end of said compartment by means of valves 19 and 20. Within compartment 11 preferably at spaced distances spigots 21 are provided on pipe 18. Water pipe 18 is placed toward the upper edge of inclined partition 13 so that the water will flow from spigots 21 down the incline into groove 14 and through tube 16 into receptacle 17.

A cone 22 is placed immediately beneath each of the spigots 21 so that the water will strike the apex of the cone and flow down into the same. Grooves 23 are provided in the sides of the cone with holes 24 in said grooves near the bottom of the cone, which holes incline downwardly to lead the water to run into said cone as it runs down the groove. An upwardly curved lower edge 25 is provided around cone 22 so that the water will be delayed and caused to run into the openings 24. A second series of openings 26 are provided near the upper end of the cone, which incline upwardly to admit the air to the upper part of the cone to equalize the air pressure within the cone. The lower edge or bottom of the cone is provided with a series of scallops 27 which form said lower edge in a series of undulations which allow the water to pass freely from the cone. The inside of the cone is packed with a mass of filtering material 28 which is preferably fibrous like cotton, to which the impurities cling.

After leaving the cones 22 the water runs down the inclined partition 13 to a mat 29 which extends lengthwise of the apartment 11 on the partition 13 a short distance above the groove 14 and is preferably held in place by means of suitable pegs 30. Mat 29 is also preferably made of a fibrous filtering material like cotton, which stops the water and filters therefrom any remaining impurities that may be contained therein.

In using the filter the water is turned on in a slow stream from the spigots 21 upon the cones 22, seeping through into said cones and the mass of fibrous material 28 therein and running out from under the scalloped edge of the cone and down to the roll or mat 29, which completes the cleansing of the water.

It has been found that the cotton fiber forms a simple and durable filtering material for the mat 29 and packing 28 within the cones, and it is apparent that the fibrous mat 29 and the bunches of fibrous material 28 may be removed and thoroughly cleansed whenever they become in any wise foul by the filtering of the water.

I claim as new:

1. In a water filter, a receptacle having a compartment with inclined bottom, a water spigot having suitable connective means for admitting water near the upper edge of said inclined bottom, a filtering cone beneath said water spigot consisting of a hollow cone having fibrous filtering material therewithin, said cone having openings therein for the admission of the water to said filtering material and exit therefrom, substantially as and for the purpose specified.

2. In a water filter, a receptacle having an inclined bottom, a water spigot having suitable connective means for admitting water near the upper edge of said inclined bottom, a filtering cone beneath said water spigot consisting of a hollow cone having filtering material therewithin and means for the admission of the water to said filtering means near the lower edge of said bottom having suitable exit for the water near its lower edge.

3. In a water filter, a receptacle having an inclined partition therein, a pipe and a series of spigots on said pipe for admitting water upon the upper portion of said partition, a series of filtering cones beneath said spigots one to each, said cones having grooved sides with openings therethrough in said grooves for admitting the air and water to the interior of the cone, filtering material within said cones, a filtering mat across said partition below said cone, said partition having a groove therein below said filtering mat and an exit for the water from said groove.

4. In a water filter, a receptacle having an inclined partition therein dividing it into upper and lower compartments, a water pipe extending through said upper compartment and having a series of spigots thereon, a series of hollow filtering cones beneath said spigots one to each spigot, said cones having grooves down their sides, and openings in said grooves to the interior of said cones, fibrous filtering material within each of said cones, turned up edges around said cones and the lower edges of said cones formed in a series of scallops for the exit of the water, a filtering mat across said partition below said cones, spaced pegs in said partition for holding said mat in position, said partition having a groove below said mat and an exit in said groove leading to the compartment below, substantially as and for the purpose specified.

In testimony whereof I have signed my name to this specification in the presence of two subscribing witnesses.

AUGUST A. DANIELSON.

Witnesses:
  A. W. KETTLE,
  I. A. ELLSWORTH.